(12) United States Patent
Miyazawa et al.

(10) Patent No.: US 12,367,355 B2
(45) Date of Patent: Jul. 22, 2025

(54) INFORMATION PROCESSING DEVICE

(71) Applicant: NIDEC INSTRUMENTS CORPORATION, Nagano (JP)

(72) Inventors: Shinya Miyazawa, Nagano (JP); Junro Takeuchi, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/663,075

(22) Filed: May 14, 2024

(65) Prior Publication Data

US 2024/0386221 A1 Nov. 21, 2024

(30) Foreign Application Priority Data

May 16, 2023 (JP) .................. 2023-080706

(51) Int. Cl.
*G06K 7/00* (2006.01)
(52) U.S. Cl.
CPC .................. *G06K 7/0091* (2013.01)
(58) Field of Classification Search
CPC .................................................. G06K 7/0091
See application file for complete search history.

(56) References Cited

U.S. PATENT DOCUMENTS

| | | | | |
|---|---|---|---|---|
| 9,578,763 B1* | 2/2017 | Wade | .................... | H05K 5/0086 |
| 10,127,409 B1* | 11/2018 | Wade | .................... | G06F 21/75 |
| 2012/0305648 A1* | 12/2012 | Sondhi | ................. | G06Q 20/325 |
| | | | | 235/441 |
| 2015/0340124 A1* | 11/2015 | Gomi | ....................... | H01B 5/04 |
| | | | | 174/126.1 |
| 2016/0300084 A1* | 10/2016 | Kuwaki | ................. | G06K 7/087 |
| 2018/0205170 A1* | 7/2018 | Andre | ........................ | H05F 3/02 |
| 2018/0288871 A1* | 10/2018 | Fujimoto | ............... | H05K 1/028 |
| 2022/0036016 A1* | 2/2022 | Chen | .................... | G06K 7/0091 |

FOREIGN PATENT DOCUMENTS

JP 2018169832 A 11/2018

\* cited by examiner

*Primary Examiner* — Tuyen K Vo
(74) *Attorney, Agent, or Firm* — HAUPTMAN HAM, LLP (57) ABSTRACT

An information processing device includes a control board, a connector board having a connector to which an IC card is attached, and a protection board formed with a breakage detection circuit. The connector board is formed with a second breakage detection circuit for detecting its own disconnection and short circuit. The connector is mounted on a face on one side of the connector board, the protection board is disposed on the one side with respect to the connector board, and the protection board has an opening part for attaching and detaching the IC card. The second breakage detection circuit is formed in at least one of a face on the opposite side of the connector board and an internal layer of the connector board, and the second breakage detection circuit is formed in at least an area of the connector board which is overlapped with the opening part.

8 Claims, 4 Drawing Sheets

INFORMATION PROCESSING DEVICE

CROSS REFERENCE TO RELATED APPLICATION

The present invention claims priority under 35 U.S.C. § 119 to Japanese Application No. 2023-080706 filed May 16, 2023, the entire contents of which are incorporated herein by reference.

TECHNICAL FIELD

At least an embodiment of the present invention may relate to an information processing device for processing information including secret information.

BACKGROUND

Conventionally, a manual type card reader which performs reading of data recorded in a card and writing of data to a card has been known (see, for example, Japanese Patent Laid-Open No. 2018-169832 (Patent Literature 1)). A card reader described in Patent Literature 1 includes a card reader main body, a front face cover and a main case body which cover the card reader main body, a control board which is a printed board for control, and a protection board which is a printed board for protecting the control board. The card reader main body includes a magnetic head for performing reading of magnetic data recorded on a card and the like, and an IC contact block having a plurality of IC contact springs for performing communication of data with an IC chip built in the card.

In the card reader described in Patent Literature 1, the control board is a rigid board. The magnetic head and the IC contact springs are electrically connected with the control board through a flexible printed board. The control board is formed with a data signal circuit for transmitting a signal of data including secret information such as magnetic data read by the magnetic head. The protection board is formed with a breakage detection circuit for detecting its own disconnection and short-circuit. The protection board is structured by bending a flexible printed board in a predetermined shape. The protection board covers the control board from both sides in an upper and lower direction, both sides in a right and left direction and a rear side.

In the card reader described in Patent Literature 1, when a criminal performs some tampering on the card reader for illegally acquiring data including secret information from the control board, the breakage detection circuit may be disconnected or short-circuited and thus, it is detected that some tampering is being performed on the card reader. Further, in the card reader described in Patent Literature 1, when disconnection or a short circuit of the breakage detection circuit is detected, predetermined processing is executed, for example, data stored in the control board are erased, or the control board is set in an unusable state. Therefore, in the card reader described in Patent Literature 1, illegal acquisition of data from the control board can be prevented.

The present inventors have been developing an information processing device for processing information including secret information such as a card reader which performs reading of data recorded in a card and the like. The information processing device includes a control board which is formed with a data signal circuit for transmitting a signal of data including secret information. Further, in an information processing device being developed, the present inventors have examined to provide a connector board on which a connector is mounted, the connecter being fitted with a small device-embedded type IC card such as a SAM (Secure Access Module) card or a SIM (Subscriber Identity Module) card which is capable of being attached and detached.

In an information processing device being developed, a control board and a connector board are, for example, rigid boards formed in a flat plate shape. The connector board is electrically connected with the control board through wiring such as a flexible printed board. A signal of data including secret information transmitted from the control board to the connector board is encrypted. In the connector board, encryption of data encrypted in a SAM card or a SIM card is decrypted. The present inventors have considered that, in order to reduce a size of an information processing device being developed, the control board and the connector board are disposed so that a thickness direction of the control board and a thickness direction of the connector board are substantially coincided with each other. The control board and the connector board are overlapped in a state separated from each other in the thickness direction of the control board.

Further, in an information processing device being developed, the present inventors have examined that, in order to prevent data including secret information from being illegally acquired from the control board, similarly to the card reader described in Patent Literature 1, a protection board in which a breakage detection circuit is formed is provided and the control board is arranged in a protected area which is an area surrounded by the protection board. In the information processing device, since the connector board is electrically connected with the control board through wiring, the present inventors considered that the connector board is arranged in the protected area together with the control board.

However, in a case that the connector board is arranging in the protected area, an opening part for attaching and detaching an IC card such as a SAM card or a SIM card to and from a connector of the connector board is required to form in the protection board. Specifically, the opening part is required to provide in a portion of the protection board on a side where the connector board is disposed in a thickness direction of the control board. When an opening part is formed in the protection board, for example, a hole may be opened in the connector board by a drill or the like inserted through the opening part. Further, when a hole is opened in the connector board, data including secret information may be illegally acquired from the control board by utilizing the hole.

SUMMARY

In view of the problem described above, at least an embodiment of the present invention may advantageously provide an information processing device having a control board which is formed with a data signal circuit for transmitting a data signal including secret information and a connector board on which a connector to which an IC card is attached is mounted and which is electrically connected with the control board and, even when an opening part for attaching and detaching an IC card is formed in a protection board forming a protected area for protecting the control board, the information processing device is capable of preventing data including secret information from being illegally acquired from the control board.

According to at least an embodiment of the present invention, there may be provided an information processing device including a control board which is formed with a data signal circuit for transmitting a data signal including secret information, a connector board on which a connector to which an IC card is attached is mounted and which is electrically connected with the control board, and a protection board which is a printed board formed with a breakage detection circuit for detecting at least one of its own disconnection and short circuit. The connector board is formed with a second breakage detection circuit for detecting at least one of its own disconnection and short circuit, a data signal including secret information which is transmitted from the control board to the connector board is encrypted, the control board and the connector board are overlapped with each other in a thickness direction of the control board, and at least a portion of the control board where the data signal circuit is formed and at least a portion of the connector board on which the connector is mounted are disposed in an inside of a protected area which is an area surrounded by the protection board. In addition, when one side in the thickness direction of the control board is defined as a first direction side, and an opposite side to the first direction side is defined as a second direction side, the connector board is disposed on the first direction side with respect to the control board, the connector is mounted on a face on the first direction side of the connector board, and the protection board includes a first protection board which is disposed on the first direction side with respect to the connector board. The first protection board is formed with an opening part for attaching and detaching the IC card to and from the connector from the first direction side with respect to the first protection board, and the second breakage detection circuit is formed in at least one of a face on the second direction side of the connector board and an internal layer of the connector board and, when viewed in the thickness direction of the control board, the second breakage detection circuit is formed in at least an area overlapped with the opening part of the connector board.

In the information processing device in at least an embodiment of the present invention, the second breakage detection circuit is formed in the connector board, and the second breakage detection circuit is formed at least in one of a face on the second direction side of the connector board and an internal layer of the connector board. Further, in this embodiment, although the first protection board disposed on the first direction side with respect to the connector board is formed with an opening part for attaching and detaching an IC card to and from the connector from the first direction side with respect to the first protection board, the second breakage detection circuit is formed in at least an area overlapped with the opening part of the connector board when viewed in the thickness direction of the control board.

Therefore, according to this embodiment, for example, in a case that a hole is opened in the connector board by a drill or the like which is inserted through the opening part of the first protection board, disconnection or a short circuit of the second breakage detection circuit can be detected. Therefore, in this embodiment, in a case that disconnection or a short circuit of the second breakage detection circuit is detected, when predetermined processing is executed, for example, data stored in the control board are erased, even if a hole is opened in the connector board by a drill or the like inserted through the opening part of the first protection board, illegal acquisition of data including secret information from the control board can be prevented.

In other words, in this embodiment, even if an opening part for attaching and detaching an IC card is formed in the protection board which forms a protected area for protecting the control board, illegal acquisition of data including secret information from the control board can be prevented. Further, in this embodiment, the second breakage detection circuit is formed in the connector board and thus, for example, in comparison with a case that a second protection board in which the second breakage detection circuit is formed is separately provided between the connector board and the control board, the structure of the information processing device can be simplified.

In this embodiment, for example, the IC card is a SAM card or a SIM card.

In this embodiment, for example, the entire connector board is disposed in the inside of the protected area, and the second breakage detection circuit is formed in an entire area of the connector board. In this case, in comparison with a case that only a part of the connector board is disposed in an inside of the protected area, a shape of the protection board which forms the protected area can be simplified. Further, in this case, the second breakage detection circuit is formed in the entire area of the connector board and thus, illegal acquisition of data including secret information from the control board can be effectively prevented.

In this embodiment, it is preferable that the information processing device includes a detection mechanism for detecting a change of a distance between the control board and the connector board in the thickness direction of the control board. According to this structure, illegal detachment of the connector board can be detected based on a detection result of the detection mechanism. Therefore, in a case that detachment of the connector board is detected, when predetermined processing is executed, for example, data stored in the control board are erased and thereby, illegal acquisition of data including secret information from the control board can be effectively prevented.

In this embodiment, the information processing device includes, for example, a housing in which the control board, the connector board and the protection board are accommodated, the housing includes a first housing part which is disposed on the first direction side with respect to the first protection board, and a cover which is detachably attached to the first housing part, the first housing part is formed with a second opening part for attaching and detaching the IC card to and from the connector from the first direction side with respect to the first housing part, and the cover closes the second opening part. In this case, even in a state that the control board, the connector board and the protection board are accommodated in the housing, when the cover is detached, an IC card can be attached to and detached from the connector. Therefore, an IC card can be easily attached to and detached from the connector.

Effects of the Invention

As described above, according to an embodiment of the present invention, in an information processing device having a control board which is formed with a data signal circuit for transmitting a data signal including secret information and a connector board on which a connector to which an IC card is attached is mounted and which is electrically connected with the control board, even when an opening part for attaching and detaching an IC card is formed in a protection board forming a protected area for protecting the control board, data including secret information can be prevented from being illegally acquired from the control board.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.
(Structure of Information Processing Device)

Figure 1:
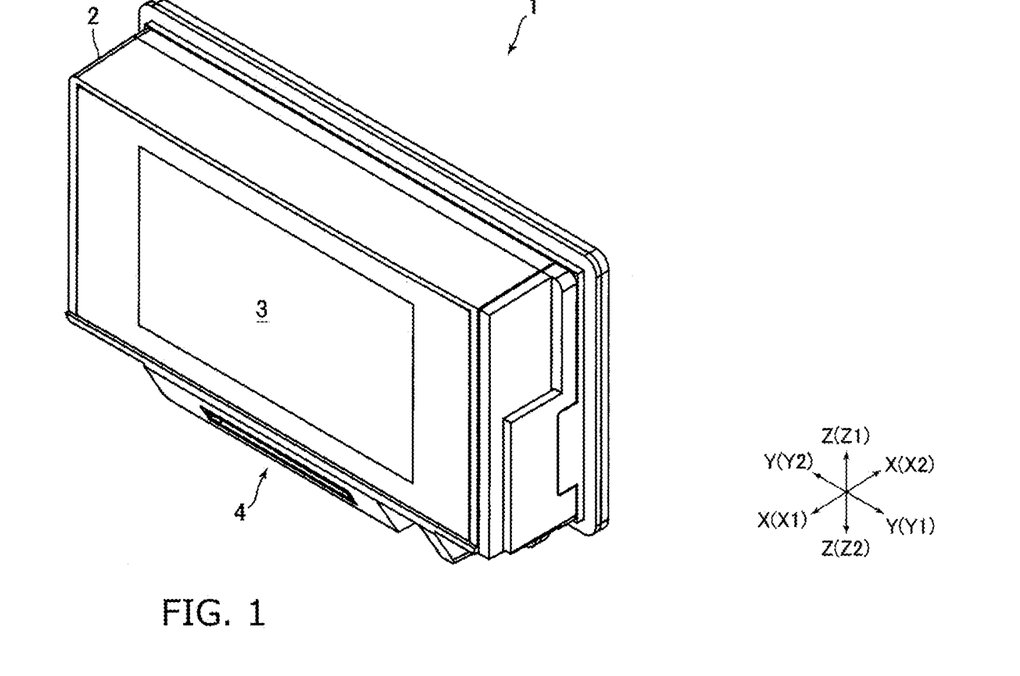
FIG. 1 is a perspective view showing an information processing device in accordance with an embodiment of the present invention which is viewed from a front face side.
Figure 2:
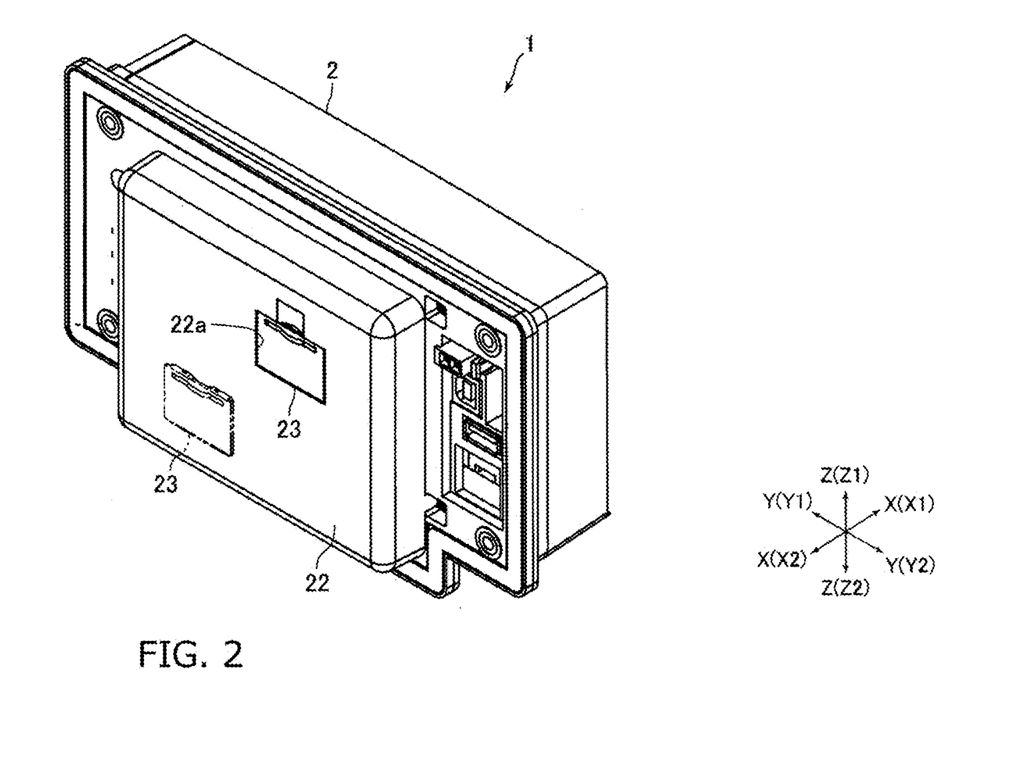
FIG. 2 is a perspective view showing the information processing device in FIG. 1 which is viewed from a rear face side.
Figure 3:
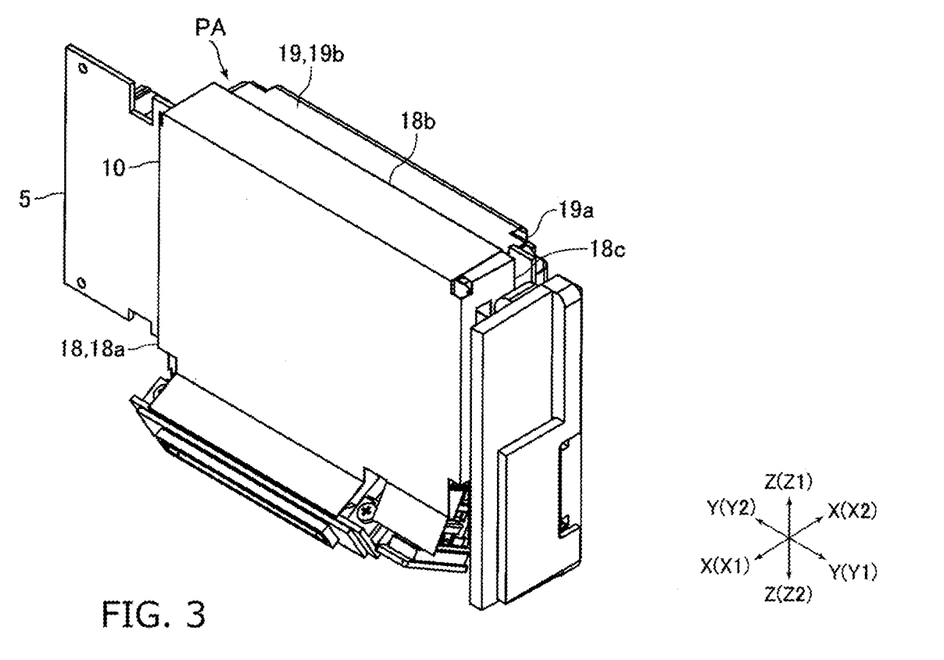
FIG. 3 is a perspective view showing a state that a housing is detached from the information processing device shown in FIG. 1.
Figure 4:
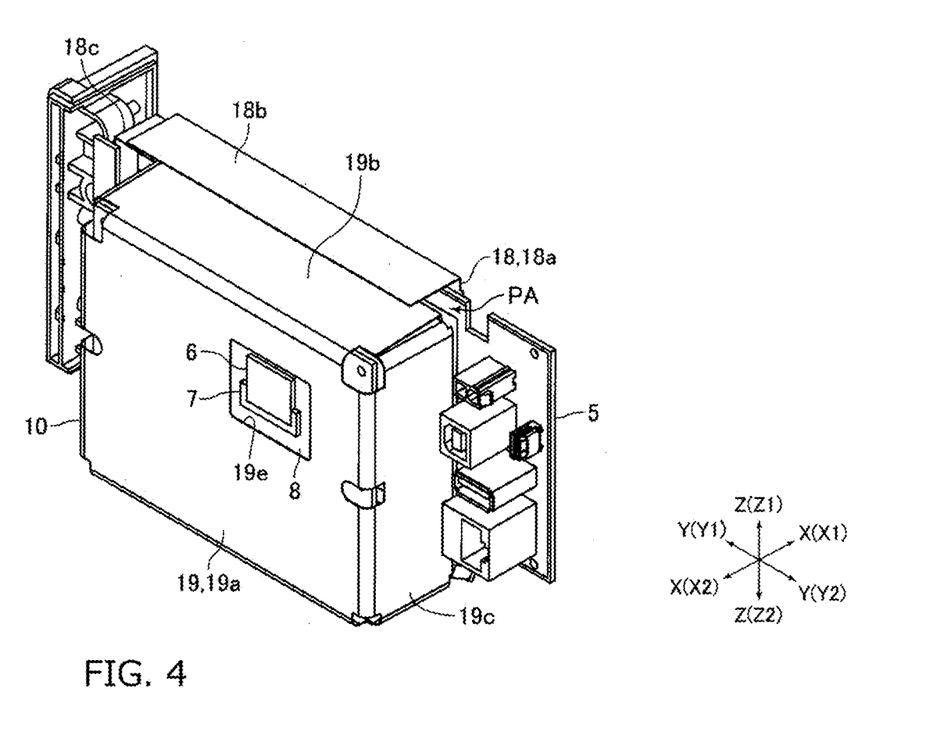
FIG. 4 is a perspective view showing a state that a housing is detached from the information processing device shown in FIG. 2.
Figure 5:
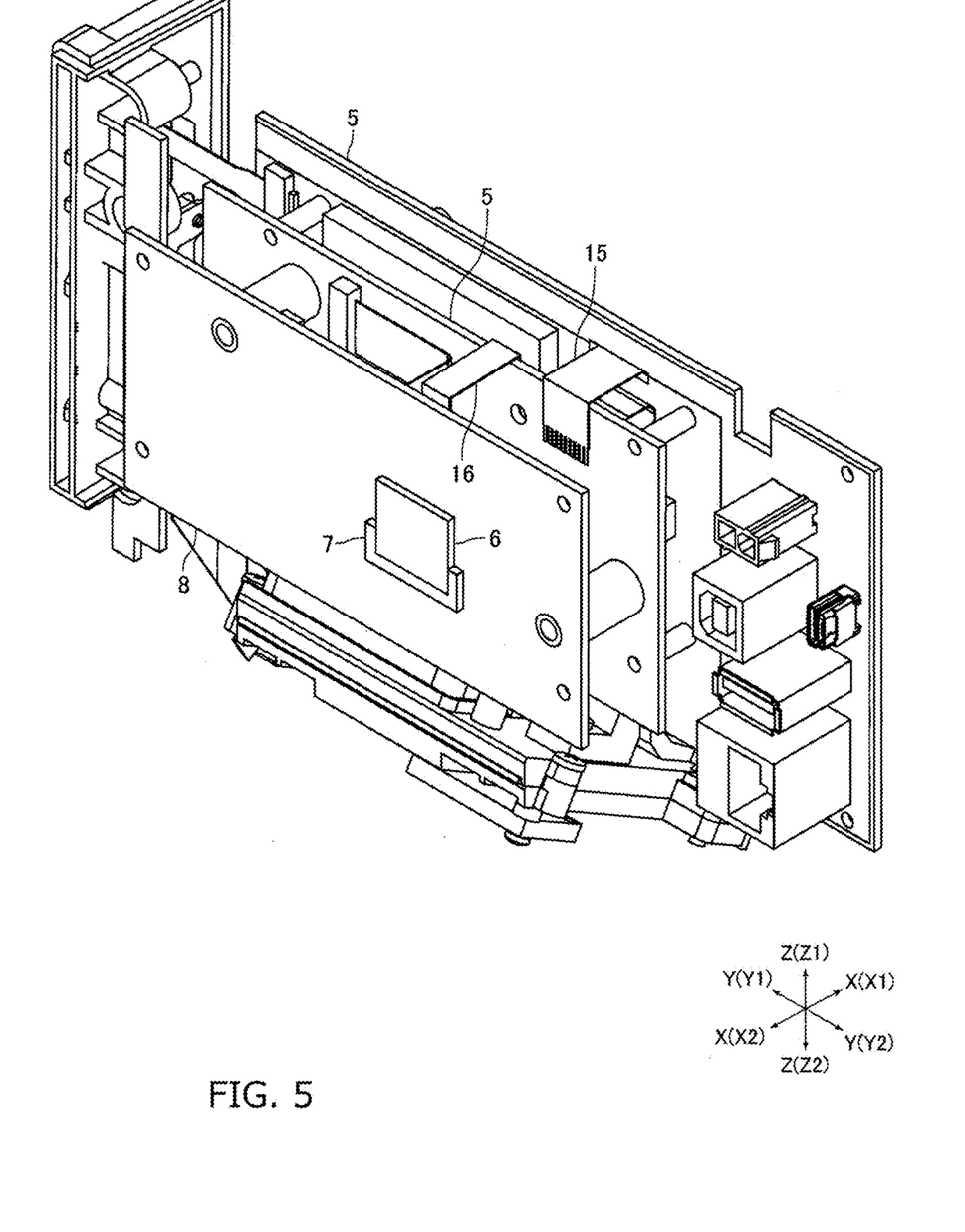
FIG. 5 is a perspective view showing a control board, a connector board and the like in a state that a protection board shown in FIG. 4 is detached.
Figure 6:
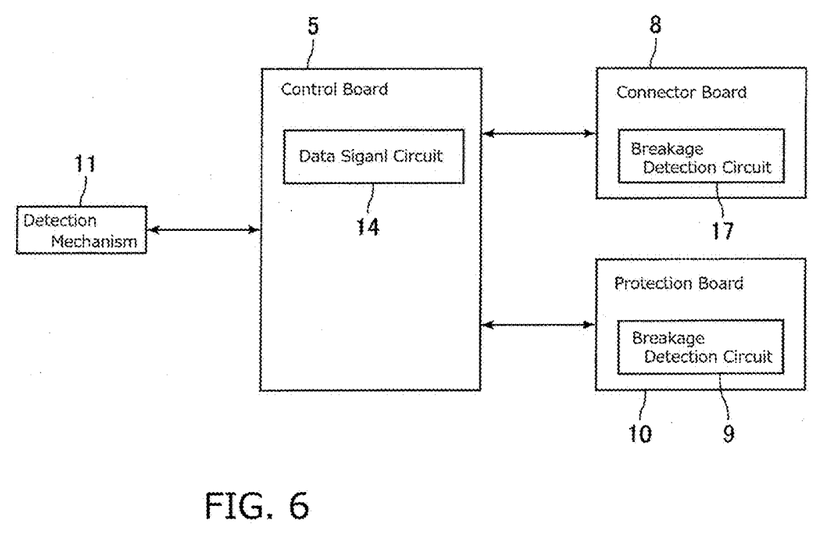
FIG. 6 is an explanatory block diagram showing a configuration of the information processing device in FIG. 1.
Figure 7:
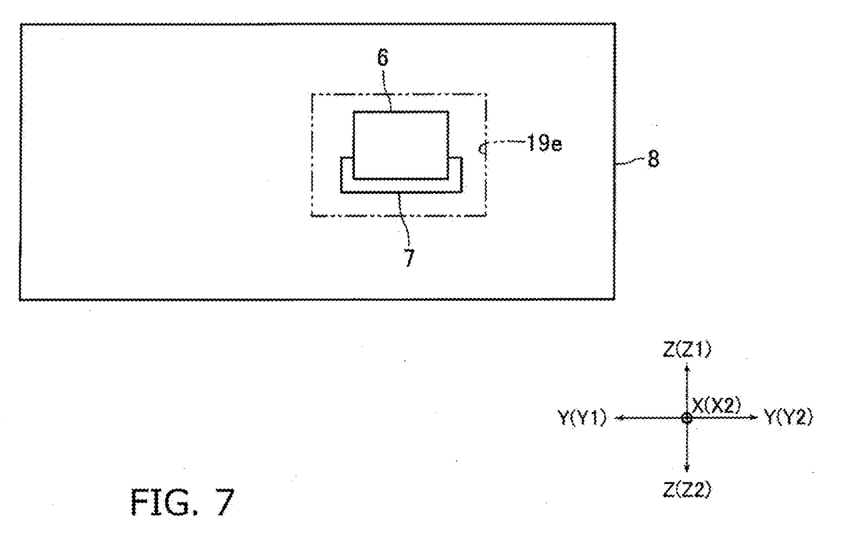
FIG. 7 is a rear view showing the connector board in FIG. 5.

FIG. 1 is a perspective view showing an information processing device 1 in accordance with an embodiment of the present invention which is viewed from a front face side. FIG. 2 is a perspective view showing the information processing device 1 in FIG. 1 which is viewed from a rear face side. FIG. 3 is a perspective view showing a state that a housing 2 is detached from the information processing device 1 shown in FIG. 1. FIG. 4 is a perspective view showing a state that the housing 2 is detached from the information processing device 1 shown in FIG. 2. FIG. 5 is a perspective view showing a control board 5, a connector board 8 and the like in a state that a protection board 10 shown in FIG. 4 is detached. FIG. 6 is an explanatory block diagram showing a configuration of the information processing device 1 in FIG. 1. FIG. 7 is rear view showing the connector board 8 in FIG. 5.

In the following descriptions, for convenience of explanation, the "Z" direction in FIG. 1 and the like is set in an upper and lower direction, the "X" direction in FIG. 1 and the like perpendicular to the upper and lower direction is set in a front and rear direction, and the "Y" direction in FIG. 1 and the like perpendicular to the upper and lower direction and the front and rear direction is set in a right and left direction. Further, the "Z1" direction side in FIG. 1 and the like which is one side in the upper and lower direction is referred to as an "upper" side, the "Z2" direction side in FIG. 1 and the like which is an opposite side to the upper side is referred to as a "lower" side, the "X1" direction side in FIG. 1 and the like which is one side in the front and rear direction is referred to as a "front" side, the "X2" direction side in FIG. 1 and the like which is an opposite side to the front side is referred to as a "rear" side, the "Y1" direction side in FIG. 1 and the like which is one side in the right and left direction is referred to as a "right" side, and the "Y2" direction side in FIG. 1 and the like which is an opposite side to the right side is referred to as a "left" side.

The information processing device 1 in this embodiment is a device for processing information including secret information. The information processing device 1 is, for example, a settlement terminal device which is used when a credit card or the like is settled. Alternatively, the information processing device 1 is, for example, mounted and used in a host apparatus such as an ATM or an automatic ticket issuing machine. The information processing device 1 is provided with a function as a card reader which communicates data with a contact type IC card or a non-contact type IC card. Further, the information processing device 1 is provided with a function as an input device in which information is inputted by using a fingertip of a user. For example, a PIN number is inputted to the information processing device 1.

The information processing device 1 includes an IC contact block having a plurality of IC contact springs structured to contact with external connection terminals of an IC chip formed on an contact type IC card, a device side communication antenna for performing non-contact communication of information with a card side communication antenna which is built in a non-contact type IC card, a housing 2 which accommodates the IC contact block and the device side communication antenna, and a touch panel 3 for inputting a PIN number. The touch panel 3 is disposed on a front face side of the information processing device 1. In this embodiment, the information processing device 1 may be provided with a magnetic head for performing reading of magnetic data recorded on a magnetic card and recording of magnetic data to a magnetic card.

In the information processing device 1, when communication of data with a contact type IC card is to be performed, the IC card is manually inserted into an inside of the information processing device 1 through a card insertion port 4 (see FIG. 1) formed on a front face side and a lower face side of the housing 2. In the information processing device 1, when communication of data is to be performed with a non-contact type IC card, the IC card is held over a portion provided with a communication antenna of the information processing device 1. In the information processing device 1, when a PIN number is to be inputted, for example, numeric keys from "0" to "9" are indicated on the touch panel 3. A user touches the touch panel 3 and inputs his/her PIN number.

Further, the information processing device 1 includes a control board 5 with which the IC contact springs, the device side communication antenna and the touch panel 3 are electrically connected. In a case that the information processing device 1 includes a magnetic head, the magnetic head is also electrically connected with the control board 5. The information processing device 1 in this embodiment includes two control boards 5. Further, the information processing device 1 includes a connector board 8 on which a connector (socket) 7 to which an IC card 6 that is a SAM card or a SIM card is attached is mounted, and a protection board 10 in which a breakage detection circuit 9 (see FIG. 6) for detecting at least one of its disconnection and short circuit is formed. The two control boards 5, the connector board 8 and the protection board 10 are accommodated in the housing 2.

The control board 5 and the connector board 8 are rigid boards such as a glass epoxy substrate and are formed in a rectangular flat plate shape. Each of the two control boards 5 is disposed so that a thickness direction of the control board 5 and the front and rear direction are coincided with each other. In other words, the front and rear direction ("X" direction) is a thickness direction of the control board 5. The connector board 8 is disposed so that a thickness direction of the connector board 8 and the front and rear direction are coincided with each other. In other words, a thickness direction of the connector board 8 and a thickness direction of the control board 5 are coincided with each other. A rear side in this embodiment ("X2" direction side) is a first direction side which is one side in a thickness direction of the control board 5, and a front side ("X1" direction side) which is its opposite side is a second direction side which is an opposite side to the first direction side.

The two control boards 5 are disposed in a separated state in the front and rear direction and are overlapped with each other in the front and rear direction. Further, the connector board 8 and the control board 5 are disposed in a separated state in the front and rear direction and are overlapped with each other in the front and rear direction. In this embodiment, the connector board 8 is disposed on a rear side with respect to the two control boards 5. The information processing device 1 includes a detection mechanism 11 (see FIG. 6) for detecting a change of a distance in the front and rear direction between the control board 5 and the connector board 8. The detection mechanism 11 is provided for detecting a change of a distance in the front and rear direction between the control board 5 disposed on a rear side (rear side control board) of the two control boards 5 and the connector board 8.

The control board 5 which is formed in a rectangular flat plate shape is disposed so that a direction of a long side of the control board 5 and the right and left direction are coincided with each other. Sizes of the two control boards 5 are different. In this embodiment, a size of the control board 5 disposed on a front side is larger than that of the rear side control board 5. Specifically, a width in the right and left direction of the front side control board 5 is set to be wider than a width in the right and left direction of the rear side control board 5. Further, a width in the upper and lower direction of the front side control board 5 is set to be slightly wider than a width in the upper and lower direction of the rear side control board 5.

As described above, the control board 5 is electrically connected with the IC contact springs, the device side communication antenna and the touch panel 3. A signal of data including secret information is inputted into the control board 5. The control board 5 is formed with a data signal circuit 14 (see FIG. 6) for transmitting a signal of data including secret information. In the control board 5, data including secret information are handled in a state that the data are not encrypted. The two control boards 5 are electrically connected with each other. Specifically, the two control boards 5 are electrically connected with each other by a wiring 15 which is a flexible printed board or a flexible flat cable.

The connector board 8 formed in a rectangular flat plate shape is disposed so that a direction of a long side of the connector board 8 and the right and left direction are coincided with each other. A size of the connector board 8 is set to be slightly smaller than a size of the rear side control board 5. The connector board 8 is electrically connected with the control board 5. Specifically, the connector board 8 is electrically connected with the control board 5 by a wiring 16 which is a flexible printed board or a flexible flat cable. In this embodiment, a signal of data including secret information transmitted from the control board 5 to the connector board 8 is encrypted. In the connector board 8, data which are not encrypted are not handled.

As described above, an IC card 6 is a SAM card or a SIM card and is a small device-embedded type IC card. The IC card 6 is inputted with encrypted data transmitted from the control board 5. The IC card 6 is capable of being attached to and detached from a connector 7. The connector 7 is mounted on a rear side face (rear face) of the connector board 8. In this embodiment, one connector 7 is mounted on a rear face of the connector board 8.

The connector board 8 is formed with a breakage detection circuit 17 (see FIG. 6) for detecting at least one of its own disconnection and short circuit. The breakage detection circuit 17 is formed on a front side face (front face) of the connector board 8 or in an internal layer of the connector board 8. Further, the breakage detection circuit 17 is formed on an entire area of the connector board 8. The breakage detection circuit 17 is, for example, configured by using a single pattern wiring. The breakage detection circuit 17 in this embodiment is a second breakage detection circuit.

The protection board 10 is structured of two flexible printed boards 18 and 19 which are bent in a predetermined shape. In other words, the protection board 10 is a flexible printed board. The breakage detection circuit 9 is formed in an entire area of each of the flexible printed boards 18 and 19. The breakage detection circuit 9 is, for example, configured of a single pattern wiring. The flexible printed board 18 is provided with a printed board part 18a which covers a part of the front side control board 5 from the front side, a printed board part 18b which covers a part of the front side control board 5 from the upper side, and a printed board part 18c which covers the entire front side control board 5 from the right side.

The printed board part 18a is formed in a flat film shape whose thickness direction is the front and rear direction. The printed board part 18a is formed in a rectangular shape. The printed board part 18a covers a portion of the front side control board 5 from the front side except its left end part. The printed board part 18b is formed in a flat film shape whose thickness direction is the upper and lower direction. The printed board part 18b is formed in a rectangular shape. The printed board part 18b is connected with an upper end of the printed board part 18a. The printed board part 18b covers a portion of the front side control board 5 from the upper side except its left end part. The printed board part 18c is formed in a flat film shape whose thickness direction is the right and left direction. The printed board part 18c is formed in a rectangular shape. The printed board part 18c is connected with a right end of the printed board part 18a.

The flexible printed board 19 is provided with a printed board part 19a which covers the rear side control board 5 and the connector board 8 from the rear side, two printed board parts 19b which cover the rear side control board 5 and the connector board 8 from both sides in the upper and lower direction, and two printed board parts 19c which cover the rear side control board 5 and the connector board 8 from both sides in the right and left direction. The flexible printed board 19 in this embodiment is configured of the printed board parts 19a through 19c. The printed board part 19a in this embodiment is a first protection board which is disposed on the rear side of the connector board 8.

The printed board part 19a is formed in a flat film shape whose thickness direction is the front and rear direction. The printed board part 19a is formed in a rectangular shape. The printed board part 19b is formed in a flat film shape whose thickness direction is the upper and lower direction. The printed board part 19b is formed in a rectangular shape. The printed board part 19b is connected with an upper end and a lower end of the printed board part 19a. The printed board part 19c is formed in a flat film shape whose thickness direction is the right and left direction. The printed board part 19c is formed in a rectangular shape. The printed board part 19c is connected with an right end and a left end of the printed board part 19a. The flexible printed board 19 is disposed on the rear side with respect to the front side control board 5 and covers the front side control board 5 from the rear side except a portion of its left end part.

The printed board part 18b is disposed on an upper side with respect to the printed board part 19b. A rear end part of the printed board part 18b and a front end part of the printed board part 19b are overlapped with each other in the upper and lower direction. The printed board part 18c is disposed on the right side with respect to the printed board part 19c disposed on the right side. A rear end part of the printed board part 18c and a front end part of the printed board part 19c are overlapped with each other in the right and left direction. An area which is surrounded by two flexible printed boards 18 and 19 is a protected area "PA" which is an area where a portion of the front side control board 5 except its left end part, the entire rear side control board 5, and the entire connector board 8 are disposed.

In this embodiment, a portion of the front side control board 5 except the left end part (in other words, a portion of the front side control board 5 which is disposed in an inside of the protected area "PA") is formed with the data signal circuit 14. However, the left end part of the front side control board 5 (in other words, a portion of the front side control board 5 which is disposed outside the protected area "PA") is not formed with the data signal circuit 14. In other words, in this embodiment, a portion of the control board 5 where at least the data signal circuit 14 is formed and a portion of the connector board 8 where at least the connector 7 is mounted are disposed inside the protected area "PA" which is an area surrounded by the protection board 10. The protected area "PA" is an area surrounded by the breakage detection circuit 9 and is an area where security is ensured.

The printed board part 19a is formed with an opening part 19e for attaching and detaching an IC card 6 to and from the connector 7 from a rear side of the printed board part 19a. The opening part 19e is a through hole in a rectangular shape which penetrates through the printed board part 19a in the front and rear direction. When viewed in the front and rear direction, an outer shape of the opening part 19e is larger than an IC card 6 and an outer shape of the connector 7 in a state that the IC card 6 is attached to the connector 7. When the information processing device 1 in a state that the housing 2 is detached is viewed from the rear side, the IC card 6 and the connector 7 in a state that the IC card 6 is attached to the connector 7 are disposed inside the opening part 19e (see FIG. 7). As described above, the breakage detection circuit 17 is formed over an entire area of the connector board 8 and, when viewed in the front and rear direction, the breakage detection circuit 17 is formed in at least an area of the connector board 8 which is overlapped with the opening part 19e.

The detection mechanism 11 is, for example, a mechanical sensor having a contact switch. The detection mechanism 11 is disposed between the rear side control board 5 and the connector board 8. For example, the rear side control board 5 and the connector board 8 are disposed at a normal position and, when a distance in the front and rear direction between the rear side control board 5 and the connector board 8 is a normal distance, the detection mechanism 11 is set to be an "ON" state. On the other hand, for example, when the connector board 8 is detached and a distance in the front and rear direction between the rear side control board 5 and the connector board 8 becomes larger, the detection mechanism 11 is turned to an "OFF" state. Therefore, it is capable of detecting a change of a distance in the front and rear direction between the rear side control board 5 and the connector board 8 by the detection mechanism 11.

As described above, the two control boards 5, the connector board 8 and the protection board 10 are accommodated in the housing 2. The housing 2 includes a first housing part 22 which is disposed on the rear side with respect to the printed board part 19a, and a cover 23 which is detachably attached to the first housing part 22. The first housing part 22 is formed in a flat plate shape which is perpendicular to the front and rear direction. The first housing part 22 is formed with an opening part 22a for attaching and detaching an IC card 6 to and from the connector 7 from the rear side of the first housing part 22. The opening part 22a in this embodiment is a second opening part.

The opening part 22a is a rectangular-shaped through hole which penetrates through the first housing part 22 in the front and rear direction. When viewed in the front and rear direction, an outer shape of the opening part 22a is set to be slightly smaller than an outer shape of the opening part 19e. The cover 23 is attached to the first housing part 22 so as to close the opening part 22a. In other words, the cover 23 closes the opening part 22a. The cover 23 is, for example, attached to the first housing part 22 in a snap-fitting manner. When the information processing device 1 in a state that the cover 23 is detached is viewed from the rear side, an IC card 6 and the connector 7 are disposed in an inside of the opening part 22a in a state that the IC card 6 is attached to the connector 7.

In this embodiment, when disconnection or a short circuit of the breakage detection circuit 17 of the connector board 8 and the breakage detection circuit 9 of the protection board 10 is detected, predetermined processing is executed, for example, data stored in the control board 5 are erased, or the control board 5 is set to be unusable. Further, in this embodiment, when it is detected by the detection mechanism 11 that a distance in the front and rear direction between the rear side control board 5 and the connector board 8 is changed, predetermined processing is executed, for example, data stored in the control board 5 are erased, or the control board 5 is set to be unusable.

(Principal Effects in this Embodiment)

As described above, in this embodiment, the breakage detection circuit 17 is formed in the connector board 8, and the breakage detection circuit 17 is formed on the front face or an internal layer of the connector board 8. Further, in this embodiment, although the printed board part 19a disposed on the rear side of the connector board 8 is formed with the opening part 19e for attaching and detaching an IC card 6 to and from the connector 7 from the rear side of the printed board part 19a, the breakage detection circuit 17 is, when viewed in the front and rear direction, formed at least in an area of the connector board 8 overlapping with the opening part 19e.

Therefore, according to this embodiment, for example, in a case that a hole is opened in the connector board 8 by a drill or the like which is inserted through the opening part 19e, disconnection or a short circuit of the breakage detection circuit 17 can be detected. Further, in this embodiment, when disconnection or a short circuit of the breakage detection circuit 17 is detected, predetermined processing, for example, data stored in the control board 5 are erased, is executed. Therefore, according to this embodiment, even when a hole is opened in the connector board 8 by a drill or the like inserted through the opening part 19e, illegal acquisition of data including secret information from the control board 5 can be prevented.

In other words, in this embodiment, even when the opening part 19e for attaching and detaching an IC card is formed in the protection board 10 in which the protected area "PA" for protecting the control board 5 is formed, illegal acquisition of data including secret information from the control board 5 can be prevented. Further, in this embodiment, the breakage detection circuit 17 is formed in the connector board 8 and thus, for example, in comparison with a case that a second protection board in which the breakage detection circuit 17 is formed is separately provided between the connector board 8 and the control board 5, the structure of the information processing device 1 can be simplified.

In this embodiment, the entire connector board 8 is disposed in an inside of the protected area "PA". Therefore, according to this embodiment, in comparison with a case that only a part of the connector board 8 is disposed in an inside of the protected area "PA", a shape of the protection board 10 for forming the protected area "PA" can be simplified. Further, in this embodiment, the breakage detection circuit 17 is formed in the entire area of the connector board 8 which is disposed on the rear side with respect to the control board 5 and thus, illegal acquisition of data including secret information from the control board 5 can be effectively prevented.

In this embodiment, the information processing device 1 includes the detection mechanism 11 for detecting that a distance in the front and rear direction between the control board 5 and the connector board 8 is changed. Therefore, according to this embodiment, illegal detachment of the connector board 8 can be detected based on a detection result of the detection mechanism 11. Further, in this embodiment, when it is detected by the detection mechanism 11 that a distance in the front and rear direction between the control board 5 and the connector board 8 has been changed, predetermined processing is executed, for example, data stored in the control board 5 are erased. Therefore, according to this embodiment, illegal acquisition of data including secret information from the control board 5 can be effectively prevented.

In this embodiment, the first housing part 22 which is disposed on the rear side with respect to the printed board part 19a is formed with the opening part 22a for attaching and detaching an IC card 6 to and from the connector 7 from the rear side. Further, in this embodiment, the cover 23 which closes the opening part 22a is detachably attached to the first housing part 22. Therefore, according to this embodiment, even in a state that the control board 5, the connector board 8 and the protection board 10 are accommodated in the housing 2, when the cover 23 is detached, an IC card 6 can be attached to and detached from the connector 7. Therefore, in this embodiment, an IC card 6 can be easily attached to and detached from the connector 7.

OTHER EMBODIMENTS

Although the present invention has been shown and described with reference to a specific embodiment, various changes and modifications will be apparent to those skilled in the art from the teachings herein.

In the embodiment described above, the breakage detection circuit 17 may be formed in both of a front face of the connector board 8 and an internal layer of the connector board 8. Further, in the embodiment described above, the breakage detection circuit 17 is not required to be formed in an entire area of the connector board 8. However, even in this case, the breakage detection circuit 17 is formed in at least an area of the connector board 8 overlapping with the opening part 19e when viewed in the front and rear direction.

In the embodiment described above, the entire connector board 8 is not required to be disposed in an inside of the protected area "PA". However, even in this case, at least a portion where the connector 7 is mounted of the connector board 8 is disposed in an inside of the protected area "PA". Further, in the embodiment described above, the entire control board 5 disposed on the rear side is not required to be disposed in an inside of the protected area "PA". However, even in this case, at least a portion of the control board 5 disposed on the rear side where the data signal circuit 14 is formed is disposed in an inside of the protected area "PA". In addition, in the embodiment described above, the entire control board 5 disposed on the front side may be disposed in an inside of the protected area "PA".

In the embodiment described above, the printed board parts 18a through 18c are integrally formed with each other. However, at least one of the printed board parts 18a through 18c may be formed separately. Further, in the embodiment described above, the printed board parts 19a through 19c are integrally formed with each other. However, at least one of the printed board parts 19a through 19c may be formed separately. In addition, in the embodiment described above, the protection board 10 may be structured of a plurality of rigid boards. Further, in the embodiment described above, the connector board 8 may be structured of a flexible printed board.

In the embodiment described above, the IC card 6 may be a small device-embedded type IC card other than a SAM card and a SIM card. Further, in the embodiment described above, two or more connectors 7 may be mounted on the connector board 8. In addition, in the embodiment described above, the number of the control board 5 which is provided in the information processing device 1 may be not less than three or, may be one. Further, in the embodiment described above, the information processing device 1 may include no detection mechanism 11.

In the embodiment described above, the information processing device 1 may not be provided with a function as a card reader and may not be provided with a function as an input device. Further, in the embodiment described above, the information processing device 1 may be provided with a function other than a card reader and an input device. For example, the information processing device 1 may be provided with a function as a two-dimensional code reader for reading two-dimensional code such as "QR" code (registered trademark), and may be provided with a function as a face authentication device for performing face authentication of a user.

Structures of Embodiments

Embodiments of the present invention may be structured as follows.

(1) An information processing device which includes:
a control board which is formed with a data signal circuit for transmitting a data signal including secret information;
a connector board on which a connector to which an IC card is attached is mounted and which is electrically connected with the control board; and a protection board which is a printed board formed with a breakage detection circuit for detecting at least one of its own disconnection and short circuit, where the connector board is formed with a second breakage detection circuit for detecting at least one of its own disconnection and short circuit, a data signal including secret information which is transmitted from the control board to the connector board is encrypted, the control board and the connector board are overlapped with each other in a thickness direction of the control board, at least a portion of the control board which is formed with the data signal circuit and at least a portion of the connector board on which the connector is mounted are disposed in an inside of a protected area which is an area surrounded by the protection board, when one side in the thickness direction of the control board is defined as a first direction side, and an opposite side to the first direction side is defined as a second direction side, the connector board is disposed on the first direction side with respect to the control board, the connector is mounted on a face on the first direction side of the connector board, the protection board includes a first protection board which is disposed on the first direction side with respect to the connector board, the first protection board is formed with an opening part for attaching and detaching the IC card to and from the connector from the first direction side with respect to the first protection board, and the second breakage detection circuit is formed in at least one of a face on the second direction side of the connector board and an internal layer of the connector board and, when viewed in the thickness direction of the control board, the second breakage detection circuit is formed in at least an area of the connector board overlapped with the opening part.

(2) The information processing device described in the above-mentioned structure (1), where the IC card is a SAM card or a SIM card.

(3) The information processing device described in the above-mentioned structure (1) or (2), where a whole of the connector board is disposed in the inside of the protected area, and the second breakage detection circuit is formed in an entire area of the connector board.

(4) The information processing device described in one of the above-mentioned structures (1) through (3), further including a detection mechanism for detecting a change of a distance between the control board and the connector board in the thickness direction of the control board.

(5) The information processing device described in one of the above-mentioned structures (1) through (4), further including a housing in which the control board, the connector board and the protection board are accommodated, where the housing includes a first housing part which is disposed on the first direction side with respect to the first protection board, and a cover which is detachably mounted on the first housing part, the first housing part is formed with a second opening part for attaching and detaching the IC card to and from the connector from the first direction side with respect to the first housing part, and the cover closes the second opening part.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing device comprising:

a control board which is formed with a data signal circuit for transmitting a data signal including secret information;

a connector board on which a connector to which an IC card is attached is mounted and which is electrically connected with the control board; and a protection board which is a printed board formed with a breakage detection circuit for detecting at least one of its own disconnection and short circuit;

wherein the connector board is formed with a second breakage detection circuit for detecting at least one of its own disconnection and short circuit;

a data signal including secret information which is transmitted from the control board to the connector board is encrypted;

the control board and the connector board are overlapped with each other in a thickness direction of the control board;

at least a portion of the control board where the data signal circuit is formed and at least a portion of the connector board on which the connector is mounted are disposed in an inside of a protected area which is an area surrounded by the protection board;

when one side in the thickness direction of the control board is defined as a first direction side, and an opposite side to the first direction side is defined as a second direction side, the connector board is disposed on the first direction side with respect to the control board;

the connector is mounted on a face on the first direction side of the connector board;

the protection board comprises a first protection board which is disposed on the first direction side with respect to the connector board;

the first protection board is formed with an opening part for attaching and detaching the IC card to and from the connector from the first direction side with respect to the first protection board; and the second breakage detection circuit is formed in at least one of a face on the second direction side of the connector board and an internal layer of the connector board and, when viewed in the thickness direction of the control board, the second breakage detection circuit is formed in at least an area of the connector board which is overlapped with the opening part.

2. The information processing device according to claim 1, wherein the IC card is a SAM card or a SIM card.

3. The information processing device according to claim 1, wherein a whole of the connector board is disposed in the inside of the protected area, and the second breakage detection circuit is formed in an entire area of the connector board.

4. The information processing device according to claim 1, further comprising a detection mechanism for detecting a change of a distance between the control board and the connector board in the thickness direction of the control board.

5. The information processing device according to claim 1, further comprising a housing in which the control board, the connector board and the protection board are accommodated,
   wherein the housing comprises a first housing part which is disposed on the first direction side with respect to the first protection board, and a cover which is detachably attached to the first housing part,
   the first housing part is formed with a second opening part for attaching and detaching the IC card to and from the connector from the first direction side with respect to the first housing part, and
   the cover closes the second opening part.

6. The information processing device according to claim 2, wherein a whole of the connector board is disposed in the inside of the protected area, and the second breakage detection circuit is formed in an entire area of the connector board.

7. The information processing device according to claim 6, further comprising a detection mechanism for detecting a change of a distance between the control board and the connector board in the thickness direction of the control board.

8. The information processing device according to claim 7, further comprising a housing in which the control board, the connector board and the protection board are accommodated,
   wherein the housing comprises a first housing part which is disposed on the first direction side with respect to the first protection board, and a cover which is detachably attached to the first housing part,
   the first housing part is formed with a second opening part for attaching and detaching the IC card to and from the connector from the first direction side with respect to the first housing part, and
   the cover closes the second opening part.

* * * * *